P. W. DILLEY.
CRANBERRY HARVESTER.
APPLICATION FILED NOV. 9, 1915. RENEWED OCT. 23, 1918.
1,302,531. Patented May 6, 1919.
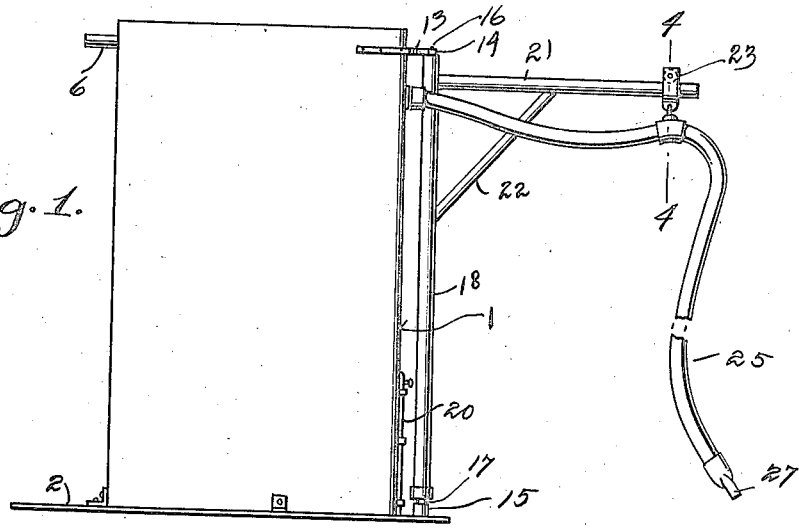
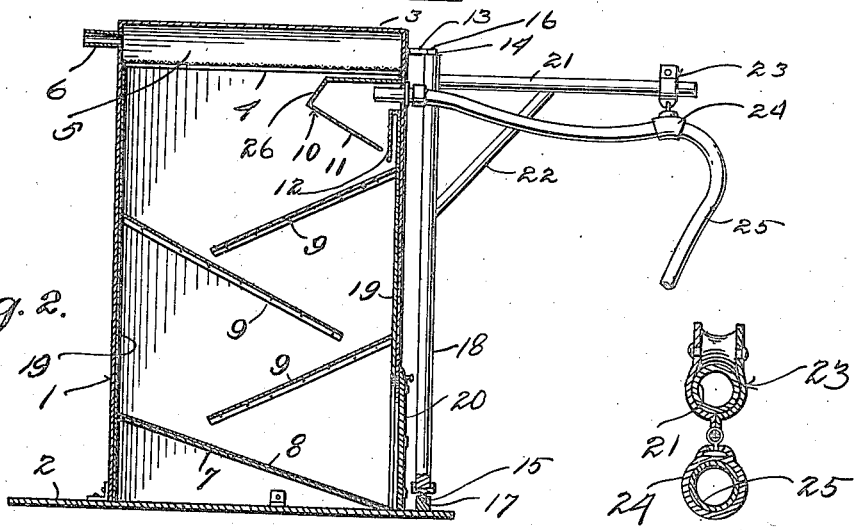
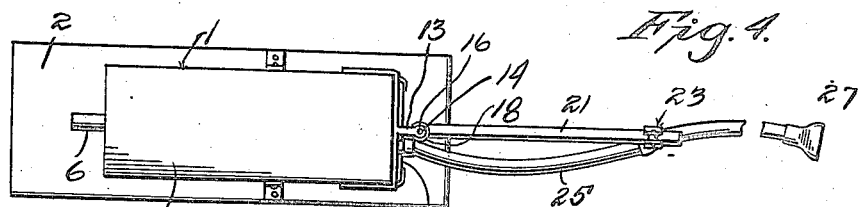

UNITED STATES PATENT OFFICE.

PHILLIP W. DILLEY, OF SEAVIEW, WASHINGTON.

CRANBERRY-HARVESTER.

1,302,531.   Specification of Letters Patent.   Patented May 6, 1919.

Application filed November 9, 1915, Serial No. 60,578. Renewed October 23, 1918. Serial No. 259,454.

*To all whom it may concern:*

Be it known that I, PHILLIP W. DILLEY, a citizen of the United States, residing at Seaview, in the county of Pacific, State of Washington, have invented certain new and useful Improvements in Cranberry-Harvesters; and I do hereby declare the following to be a full, clear, and exact description of the invention, such as will enable others skilled in the art to which it appertains to make and use the same.

The present invention is directed to improvements in harvesters and more particularly to one for harvesting cranberries from the growing plants.

The invention has for its object to provide a device of this character constructed in such a manner that the berries can be removed from the plants by pneumatic action.

A further object of the invention is to provide a device of this character so constructed that the picking nozzle can be swung in any desired direction.

A still further object of the invention is to provide means whereby the picked berries will be prevented from becoming bruised when entering the receiving casing.

With these and other objects in view, this invention resides in the novel features of construction, formation, combination and arrangement of parts to be hereinafter more fully described, claimed and illustrated in the accompanying drawing, in which:

Figure 1 is a side elevation of the device.

Fig. 2 is a vertical central sectional view through the same.

Fig. 3 is a top plan view.

Fig. 4 is a sectional view on line 4—4 of Fig. 1.

Referring to the drawing the numeral 1 designates the receiving casing which is suitably supported on a platform 2, said casing having its upper end closed by the top 3. Mounted in the casing and slightly below the top 3 is a wire mesh screen 4, which forms in conjunction with the top 3 a suction chamber 5, said chamber having leading therefrom a pipe 6, said pipe being connected in any suitable manner to a suction fan (not shown).

The casing 1 is provided with a downwardly inclined bottom 7, which is provided on its upper surface with a suitable sheet of cushioning material 8. Arranged above the bottom 1 are downwardly inclined strips 9 preferably formed from canvas, said strips having their side edges secured in any suitable manner to the sides of the casing 1. The strips 9 will obviously serve to prevent the berries from becoming bruised during the travel of the same thereover, and will further serve to deposit the berries gently upon the bottom 7, said strips being arranged in zig-zag relation.

Mounted interiorly of the casing 1, and adjacent the top thereof is a hood 10, said hood having its bottom 11 inclined downwardly so as to direct the berries which are drawn into the hood to the uppermost strip 9. It will be noted that the bottom 11 of the hood 10 has its lower edge spaced from the adjacent end of the casing 1 so as to accommodate the flexible sheet 12, which is suspended in any suitable manner and serves to arrest the movement of the berries as they leave the bottom of the hood.

Fixed adjacent the upper end of the casing 1 is a bracket 13, said bracket having a bearing 14 formed therein which is alined with a bearing 15 mounted on the platform 2, said bearings being for the purpose of supporting the trunnions 16 and 17, respectively, of the standard 18, said standard being preferably formed from tubular metal.

The interior of the casing 1 is lined with suitable cushioning material 19 so as to aid in preventing bruising of the berries as they gravitate to the bottom 7, said casing being also provided with a door 20, whereby the picked berries may be removed from the casing when desired, said door being located adjacent the lower end of the bottom 7.

A horizontal arm 21 has its inner end fixed adjacent the upper end of the standard 18 and is braced by the bar 22. Adapted for longitudinal travel upon the arm 21 is a carriage 23, said carriage having swivelly connected to its lower end a sleeve 24, in which is engaged the flexible tube 25. The upper end of the tube 25 is inserted in the casing 1 adjacent its top and is alined with the inclined back 26 of the hood 10. The outer end of the tube 25 is provided with a picking nozzle 27, and since the same is connected to the tube 25 it is obvious that said nozzle can be placed in proper position with respect to the plants to remove the berries therefrom. By providing the arm 21 the tube 25 will be prevented from becoming tangled, and it will be further noted that since the arm 21 can swing laterally that the nozzle can be swung to cover a great area of ground, whereby berries can be reached on bushes which are some distance from the casing 1. Since the carriage 23 is capable of moving longitudinally of the arm 21 it is obvious that said arm can be swung laterally without placing any strain upon that portion of the tube 25 which is located between the sleeve 24 and casing 1.

In operation the suction pump is started, which action will create a suction in the casing 1, and upon placing the nozzle 27 adjacent the berries the same will be sucked from the bushes and drawn into the casing 1. The screen 4 will prevent any twigs or other foreign matter from entering the pump casing.

It will be of course understood that the device can be used for picking berries other than cranberries if desired.

To remove foreign matter from the hood 11 the pipe 25 can be removed from the casing.

What is claimed is:

In a device for picking berries, the combination with a casing, of a hood mounted interiorly of the casing and having its bottom inclined downwardly, the forward edge of said bottom being spaced from the adjacent wall of the casing, a vertically disposed flexible sheet arranged in the space between the lower edge of said bottom and the adjacent wall, downwardly inclined strips mounted in the casing and below the hood, said flexible sheet serving to retard the movement of berries leaving the hood, and means for drawing, by suction, the berries into said hood.

In testimony whereof, I affix my signature, in the presence of two witnesses.

PHILLIP W. DILLEY.

Witnesses:
W. R. VAUGHN,
S. D. HOMER.